(12) United States Patent
Takeishi et al.

(10) Patent No.: US 8,293,375 B2
(45) Date of Patent: Oct. 23, 2012

(54) HEAT SEALABLE MULTILAYER FILM

(75) Inventors: Ichiro Takeishi, Koga (JP); Takeshi Shimizu, Koga (JP)

(73) Assignee: Mitsui Chemicals Tohcello Inc., Chiyoda-Ku, Tokyo (JP)

( * ) Notice: Subject to any disclaimer, the term of this patent is extended or adjusted under 35 U.S.C. 154(b) by 137 days.

(21) Appl. No.: 12/867,636

(22) PCT Filed: Apr. 2, 2009

(86) PCT No.: PCT/JP2009/056894
§ 371 (c)(1),
(2), (4) Date: Aug. 13, 2010

(87) PCT Pub. No.: WO2009/123286
PCT Pub. Date: Oct. 8, 2009

(65) Prior Publication Data
US 2010/0310890 A1    Dec. 9, 2010

(30) Foreign Application Priority Data

Apr. 3, 2008  (JP) ................................. 2008-097632
Aug. 11, 2008  (JP) ................................. 2008-207528

(51) Int. Cl.
*B32B 27/08* (2006.01)
(52) U.S. Cl. ...................................................... 428/515
(58) Field of Classification Search .................... None
See application file for complete search history.

(56) References Cited

FOREIGN PATENT DOCUMENTS

| | | | |
|---|---|---|---|
| JP | 63-179741 | A | 7/1988 |
| JP | 2001-219512 | A | 8/2001 |
| JP | 2003-136649 | A | 5/2003 |
| JP | 2005-88283 | A | 4/2005 |
| JP | 2005-212798 | A | 8/2005 |
| JP | 2006-1055 | A | 1/2006 |
| JP | 2006-131233 | A | 5/2006 |
| JP | 2006-256637 | A | 9/2006 |
| WO | WO 02/064367 | * | 8/2002 |

OTHER PUBLICATIONS

International Search Report (PCT/ISA/210) dated Jul. 7, 2009.

* cited by examiner

*Primary Examiner* — Sheeba Ahmed
(74) *Attorney, Agent, or Firm* — Buchanan Ingersoll & Rooney PC

(57) ABSTRACT

At heat sealable multilayer film includes a cohesive failure heat seal layer (1) that includes a resin composition including 75 to 85 wt % of a propylene polymer (A) and 15 to 25 wt % of an ethylene polymer (B) (based on the total of (A) and (B) of 100 wt %), and a support layer (2) including a propylene block copolymer (C). The heat sealable multilayer film can package oil-rich contents to be retort sterilized without separation (delamination) of a cohesive failure heat seal layer due to penetration of oil from the contents and have appropriate heat seal strength and excellent easy openability, and can be opened with stable peel conditions.

10 Claims, No Drawings

HEAT SEALABLE MULTILAYER FILM

FIELD OF THE INVENTION

The present invention relates to heat sealable multilayer films. In more detail, the invention relates to heat sealable multilayer films suited as packaging materials for containing oil-rich contents that are retort sterilized. The heat sealable multilayer films have an excellent balance between resistance to separation (delamination) of a cohesive failure heat seal layer due to penetration of oil in oil-rich contents packaged in the films, and easy opening properties (easy openability) in taking out the contents, and are suitably used as packaging materials or the like.

BACKGROUND OF THE INVENTION

Food packaging materials are required to have both good sealing properties and good openability permitting easy seal failure when the contents are taken out.

Polypropylene films or the like are conventionally used in this field. Patent Document 1 discloses a co-extruded multilayer film wherein a laminating resin layer (A) containing a propylene resin (a) is laminated adjacent to a heat seal resin layer (B) having a thickness of 1 to 15 μm which contains a propylene resin (b1) and a high density polyethylene (b2) with a density of not less than 0.955 g/cm$^3$ in a total amount of not less than 95 wt % and in a mass ratio (b1)/(b2) of 40/60 to 75/25.

The patent document describes that the film can be heat sealed easily and stably over a wider range of temperatures, can withstand breakage at the heat sealed part in retort sterilization or the like, and can be easily opened without delamination.

When oil-rich contents are packaged in these easy-open films and are retort sterilized, however, oil penetrates into the films to cause unstable peeling such as separation (delamination) or stringing of a cohesive failure heat seal layer.

Patent Document 2 discloses a multilayer laminate film wherein a first layer is a resin layer comprising a resin composition which is obtained from a high-pressure low-density polyethylene resin having MFR of 1 to 7 g/10 min and a polypropylene resin having MFR of 15 to 30 g/10 min as main components in a ratio of 20 to 60 parts by weight for the former resin and 40 to 80 parts by weight for the latter resin, and a second layer is composed of one, or two or more resin layers comprising a resin composition which is obtained from a single site catalyzed ethylene/α-olefin copolymer, a high density polyethylene having a density of not less than 0.935 g/cm$^3$ or a polypropylene resin as a main component.

In Example 5 of Patent Document 2, a co-extruded multilayer laminate film having different three layers is described wherein the first layer is a resin layer comprising a resin composition from 40 parts by weight of a high-pressure low-density polyethylene resin and 60 parts by weight of a polypropylene copolymer, the second layer is a resin layer comprising a single site catalyzed ethylene/α-olefin copolymer, and the third layer is a resin layer comprising a polypropylene copolymer.

However, stable heat sealing properties cannot be obtained when oil-rich contents are packaged in laminate films that include a first layer comprising a resin composition from 40 parts by weight of a high-pressure low-density polyethylene resin, and a second and a third layer comprising an ethylene/α-olefin copolymer and a polypropylene copolymer respectively. In retort applications in particular, even when such films are designed to achieve the desired heat seal strength, the actual heat seal strength tends to be greatly variable and stable performances cannot be obtained. This tendency is probably because oil contained in oil-rich foods penetrates into the laminate films during retort sterilization and increases the probability of separation (delamination) or stringing of a cohesive failure heat seal layer.

Meanwhile, the melting point of linear low density polyethylenes (L-LDPE) is proportional to the density of the resins, and the higher the density, the higher the melting point. When they are retort processed at high temperatures, however, they may be partially molten and be delaminated from a substrate such as polyester (PET) or nylon (Ny), or the films may be clouded by recrystallization similar to high density polyethylenes (HDPE).

Low density polyethylenes (LDPE) generally have a melting point of about 110° C. When they are subjected to retort processing and sterilization near or above their melting points, they will be molten and be delaminated from a substrate such as polyester (PET) or nylon (Ny).

The melting point of high density polyethylenes (HDPE) is generally about 132° C. When they are retort processed at high temperatures of 127° C. or above, they may be partially molten and be delaminated from a substrate such as polyester (PET) or nylon (Ny), or the films may be clouded by recrystallization.

Patent Document 3 discloses a lid material using a co-extruded multilayer laminate film that is obtained similar to Patent Document 2 except that the polypropylene resin having MFR of 15 to 30 g/10 min for the first layer is replaced by a propylene/ethylene random copolymer having MFR of 1 to 15 g/10 min.

In Example 5 of Patent Document 3, a co-extruded multilayer laminate film having different three layers is described wherein the first layer is a resin layer comprising a resin composition from 30 parts by weight of a high-pressure low-density polyethylene resin and 70 parts by weight of a propylene/ethylene random copolymer, the second layer is a resin layer comprising a polypropylene copolymer, and the third layer is a resin layer comprising a single site catalyzed ethylene/α-olefin copolymer.

However, stable heat sealing properties cannot be obtained when oil-rich contents are packaged in laminate films that include a first layer comprising a resin composition from 30 parts by weight of a high-pressure low-density polyethylene resin, and a second and a third layer comprising a polypropylene copolymer and an ethylene/α-olefin copolymer. In retort applications in particular, even when such films are designed to achieve the desired heat seal strength, the actual heat seal strength tends to be greatly variable and stable performances cannot be obtained.

This tendency is probably because oil contained in oil-rich foods penetrates into the laminate films during retort sterilization and increases the probability of separation (delamination) or stringing of a cohesive failure heat seal layer.

PRIOR ART DOCUMENTS

Patent Documents

Patent Document 1: JP-A-2005-88283
Patent Document 2: JP-A-2006-1055
Patent Document 3: JP-A-2006-256637

SUMMARY OF THE INVENTION

It is therefore an object of the present invention to provide heat sealable multilayer films suited as packaging materials or the like which have well-balanced properties wherein the heat sealable multilayer films can package oil-rich contents to be retort sterilized without separation (delamination) of a cohesive failure heat seal layer due to penetration of oil from the contents and have easy openability in taking out the contents.

A heat sealable multilayer film according to the present invention comprises a cohesive failure heat seal layer (1) that comprises a resin composition including 75 to 85 wt % of a propylene polymer (A) and 15 to 25 wt % of an ethylene polymer (B) (based on the total of (A) and (B) of 100 wt %), and a support layer (2) comprising a propylene block copolymer (C).

Advantageous Effects of the Invention

In the heat sealable multilayer films of the invention, the amount of the ethylene polymer (B) in the resin composition forming the cohesive failure heat seal layer (1) is small ranging from 15 to 25 wt %, and the support layer (2) is formed of the propylene block copolymer (C). These features ensure that even when oil-rich contents to be retort sterilized are packaged, the films are free of separation (delamination) of the cohesive failure heat seal layer due to penetration of oil from the contents and the films have appropriate heat seal strength. Accordingly, the heat sealed part will not be delaminated during transportation or storage and the films of the invention show excellent easy-open properties in taking out the contents.

PREFERRED EMBODIMENTS FOR CARRYING OUT THE INVENTION

<Propylene Polymers (A) and (H)>

A propylene polymer (A) that is a component forming a cohesive failure heat seal layer (1), and a propylene polymer (H) forming a laminate layer (3) in a heat sealable multilayer film of the invention may be each a propylene homopolymer or a propylene-based random or block copolymer of propylene and a C2-10 α-olefin such as ethylene, 1-butene, 1-hexene, 4-methyl-1-pentene, 1-octene or 1-decene. The propylene polymers (A) and (H) may be the same or different from each other.

When they are copolymers, the copolymers contain propylene at not less than 60 wt %, and preferably not less than 65 wt %. A preferred propylene polymer for the cohesive failure heat seal layer (1) is a propylene/α-olefin random copolymer (D). In another preferred embodiment, the propylene/α-olefin random copolymer (D) may be mixed with various ethylene polymers while still achieving the object of the invention.

MFR (JIS K 7210, 230° C.) of the propylene polymers (A) and (H) is not particularly limited as long as use as films is possible, but is generally in the range of 0.5 to 20 g/10 min, and preferably 1 to 15 g/10 min.

<Propylene/α-Olefin Random Copolymers (D)>

The propylene/α-olefin random copolymer (D) that is a preferred component for forming the cohesive failure heat seal layer (1) of the heat sealable multilayer film has a melting point of 135 to 150° C., and preferably 135 to 145° C. The propylene/α-olefin random copolymers (D) having this melting point generally contain propylene at 98 to 86 wt %. The α-olefins to be copolymerized with propylene are C2-10 α-olefins such as ethylene, 1-butene, 1-hexene, 4-methyl-1-pentene and 1-octene. The copolymer may be a random copolymer containing two or more kinds of these α-olefins.

<Propylene Block Copolymers (C)>

A propylene block copolymer (C) forming a support layer (2) of the heat sealable multilayer film of the present invention is a composition that includes a crystalline propylene polymer component being a propylene homopolymer or a random copolymer of propylene and a small amount of α-olefin, and an amorphous or low-crystalline copolymer component being a propylene/ethylene random copolymer in a mass ratio of 60:40 to 97:3, preferably 65:35 to 95:5, and more preferably 70:30 to 89:11. Such compositions are generally produced and marketed under the name of propylene block copolymers.

The crystalline propylene polymer component in the propylene block copolymer (C) has a high melting point ranging from 158 to 170° C., and therefore the support layer (2) is not molten and is not delaminated from a substrate such as polyester (PET) or nylon (Ny) even when subjected to retort processing at high temperatures. Because the propylene polymer component is not molten, recrystallization of the propylene polymer component does not take place and the clouding of films is prevented.

The propylene block copolymers (C) may be prepared by known methods. For example, the propylene block copolymers may be obtained by producing the propylene polymer component and the copolymer component in plural polymerizers or by producing these components separately in respective polymerizers and melt-mixing them, or these methods may be performed in combination together.

The propylene block copolymer (C) may be used as the propylene polymer (A) that is a component forming the cohesive failure heat seal layer (1) in the heat sealable multilayer film of the invention, or as the propylene polymer (H) forming the laminate layer (3) in the heat sealable multilayer film of the invention.

<Ethylene Polymers (B)>

An ethylene polymer (B) that is a component forming the cohesive failure heat seal layer (1) in the heat sealable multilayer film of the invention may be a known polyethylene. Examples thereof include high density polyethylenes, medium density polyethylenes, high-pressure low-density polyethylenes, linear low density polyethylenes and ethylene/α-olefin random copolymers.

A preferred ethylene polymer (B) for the cohesive failure heat seal layer (1) is a high-pressure low-density polyethylene (E). The high-pressure low-density polyethylene (E) may be used together with various other ethylene polymers while still achieving the object of the invention. When the high-pressure low-density polyethylene (E) is used together with an ethylene/α-olefin random copolymer (F), the amounts of the polymers are preferably 100 to 50 wt % for the high-pressure low-density polyethylene (E) and 0 to 50 wt % for the ethylene/α-olefin random copolymer (F), and particularly preferably 100 to 70 wt % for the high-pressure low-density polyethylene (E) and 0 to 30 wt % for the ethylene/α-olefin random copolymer (F) (the total of (E) and (F) is 100 wt %).

<High-Pressure Low-Density Polyethylenes (E)>

The high-pressure low-density polyethylene (E) is a preferred component forming the cohesive failure heat seal layer (1) in the heat sealable multilayer film of the invention. It generally has a density of 905 to 940 kg/m$^3$, and preferably 910 to 935 kg/m$^3$. MFR (JIS K 7210, 190° C.) of the high-pressure low-density polyethylene (E) is not particularly limited as long as use as films is possible, but is in the range of 0.1 to 9 g/10 min, and preferably 0.3 to 7 g/10 min.

MFR (JIS K 7210, 190° C.) of the high-pressure low-density polyethylene (E) that exceeds the above range may increase the probability of separation (delamination) or stringing of the cohesive failure heat seal layer due to penetration of oil contained in oil-rich foods to be retort sterilized.

If MFR (JIS K 7210, 190° C.) of the high-pressure low-density polyethylene (E) is less than the above range, molding properties tend to be deteriorated.

The high-pressure low-density polyethylenes (E) may be produced by known methods such as autoclave processes or tubular processes.

<Ethylene/α-Olefin Random Copolymers (F) and (G)>

Ethylene/α-olefin random copolymers (F) and (G) of the present invention are random copolymers of ethylene and an α-olefin of 3 or more carbon atoms, preferably 4 to 10 carbon atoms. Examples of the α-olefins include 1-butene, 3-methyl-1-pentene, 4-methyl-1-pentene, 1-hexene, 1-octene, 1-decene, 1-tetradecene and 1-octadecene. Of these, 1-butene, 1-hexene and 1-octene are particularly preferred. The α-olefins may be used singly, or two or more kinds may be used in combination. A mixture of different ethylene/α-olefin random copolymers may be used. The ethylene/α-olefin random copolymers (F) and (G) may be the same or different.

Preferred ethylene/α-olefin random copolymers (F) and (G) are ethylene/1-butene random copolymer, ethylene/1-hexene random copolymer and ethylene/1-octene random copolymer.

The ethylene/α-olefin random copolymers (F) and (G) have a density of 865 to 910 kg/m$^3$, and preferably 875 to 900 kg/m$^3$.

The ethylene/α-olefin random copolymers (F) and (G) have an ethylene unit content of 70 to 95 mol %, preferably 75 to 93 mol %, and an α-olefin unit content of 5 to 30 mol %, preferably 7 to 25 mol %.

The melt flow rate (MFR) (JIS K 7210, 190° C.) of the ethylene/α-olefin random copolymers (F) and (G) is not particularly limited as long as use as films is possible, but is generally in the range of 0.1 to 9 g/10 min, and preferably 0.3 to 7 g/10 min.

The cohesive failure heat seal layer (1) in the heat sealable multilayer film of the invention is formed of a resin composition including 75 to 85 wt % of the propylene polymer (A) and 15 to 25 wt % of the ethylene polymer (B) (the total of (A) and (B) is 100 wt %). The resin composition may contain additives or other polymers as required while still achieving the object of the invention. Exemplary additives are antioxidants, weathering stabilizers, antistatic agents, anti-fogging agents, inorganic fillers and tackifiers. In particular, processability and workability in film production, laminating process, packaging process or the like are improved by adding anti-blocking agents or slip agents.

The propylene block copolymer (C) and the propylene polymer (H) forming the support layer (2) and the laminate layer (3) in the heat sealable multilayer film of the invention may be blended with additives or other polymers as required while still achieving the object of the invention. Exemplary additives are antioxidants, weathering stabilizers, antistatic agents, anti-fogging agents, inorganic fillers and tackifiers. In particular, processability and workability in film production, laminating process, packaging process or the like are improved by adding anti-blocking agents or slip agents to the laminate layer (3).

<Heat Sealable Multilayer Films>

The heat sealable multilayer film of the invention includes a cohesive failure heat seal layer (1) and a support layer (2). The heat sealable multilayer film may be formed with a cohesive failure heat seal layer (1), a support layer (2) and a laminate layer (3).

[Cohesive Failure Heat Seal Layer (1)]

The cohesive failure heat seal layer (1) comprises a resin composition including 75 to 85 wt %, preferably more than 75 wt % to not more than 80 wt %, and more preferably more than 75 wt % to less than 80 wt % of the propylene polymer (A), and 15 to 25 wt %, preferably more than 15 wt % to not more than 20 wt %, and more preferably more than 15 wt % to less than 20 wt % of the ethylene polymer (B) (the total of (A) and (B) is 100 wt %).

A preferred ethylene polymer (B) is the high-pressure low-density polyethylene (E). To achieve low-temperature sealing properties, the ethylene/α-olefin random copolymer (F) may be mixed while the amount of the ethylene polymer (B) is in the above-mentioned range.

The ethylene polymer (B) used in an amount exceeding the above range may increase the probability of separation (delamination) or stringing of the cohesive failure heat seal layer due to penetration of oil contained in oil-rich foods to be retort sterilized.

If the amount of the ethylene polymer (B) is less than the above range, easy openability tends to be deteriorated.

The cohesive failure heat seal layer (1) is usually a non-stretched film having a thickness of 1 to 30 μm, and preferably 2 to 25 μm.

[Support Layer (2)]

The support layer (2) comprises the propylene block copolymer (C) and is usually a non-stretched film having a thickness of 1 to 50 μm, and preferably 3 to 50 μm.

The rigidity of the support layer (2) of the heat sealable multilayer film may be controlled as required by using a composition containing the propylene block copolymer (C) and one or more kinds of the ethylene/α-olefin random copolymers (G). The use of such composition facilitates designing and controlling the heat seal strength; and stable strength can be obtained.

When the ethylene/α-olefin random copolymer(s) (G) is used in the support layer (2), the amount of the propylene block copolymer (C) is desirably in the range of 100 to 60 wt %, preferably 97 to 70 wt %, and the amount of the ethylene/α-olefin random copolymers(s) (G) is desirably in the range of 0 to 40 wt %, preferably 3 to 30 wt % (the total of (C) and (G) is 100 wt %).

The propylene block copolymer (C), or the composition of the propylene block copolymer (C) and the ethylene/α-olefin random copolymer(s) (G) desirably has a melting point higher than that of the propylene polymer (A) forming the cohesive failure heat seal layer (1).

In a preferred embodiment, the ethylene polymer (B) may be added to the composition for the support layer (2) in amounts that do not deteriorate easy opening properties.

The amount of the ethylene polymer (B) is in the range of 0 to 30 wt %, and preferably 0 to 20 wt % (the total of the composition for the support layer (2) is 100 wt %).

The heat sealable multilayer film of the invention may be produced by co-extruding the cohesive failure heat seal layer (1) and the support layer (2).

Desirably, the laminate layer (3) is laminated on the surface of the support layer (2), on the opposite side of which to the cohesive failure heat seal layer (1) is laminated. In particular, it is preferable that a laminate layer (3) comprising the propylene polymer (H) is laminated. To improve printing properties or dry laminating properties, the support layer (2) or the laminate layer (3) may be surface treated by known methods such as corona treatment.

Preferably, the melting point of the propylene polymer (H) of the laminate layer (3) is lower than that of the propylene block copolymer (C) or the composition of the propylene block copolymer (C) and the ethylene/α-olefin random copolymer (G) forming the support layer (2).

The heat sealable multilayer film is preferably laminated to a substrate layer through the support layer (2) or the laminate layer (3).

The substrate layers laminated with the support layer (2) or the laminate layer (3) of the heat sealable multilayer film may be various materials used as general packaging materials. Examples thereof include thermoplastic resin films, for example, polyolefin films such as polyethylene films, polypropylene films, polybutene films and polymethylpentene films; polyester films such as polyethylene terephthalate films and polycarbonate films, nylon films, polystyrene films, polyvinyl chloride films, polyvinylidene chloride films, polyvinyl alcohol films, ethylene/vinyl alcohol copolymer films, polymethyl methacrylate films and ethylene/vinyl acetate copolymer films; aluminum foils; and paper. The thermoplastic resin film substrates may be non-stretched films, uniaxially stretched films, or biaxially stretched films. A single, or two or more substrate layers may be used.

When the heat sealable multilayer film of the invention is composed of the cohesive failure heat seal layer (1) and the support layer (2), the total thickness is normally in the range of 10 to 100 μm, preferably 20 to 70 μm, the thickness of the cohesive failure heat seal layer (1) is normally in the range of 1 to 30 μm, preferably 2 to 25 μm, and the thickness of the support layer (2) is normally in the range of 1 to 50 μm, preferably 3 to 50 μm.

When the laminate layer (3) is provided, the thickness thereof is normally in the range of 1 to 30 μm, preferably 2 to 30 μm.

<Production of Heat Sealable Multilayer Films>

The heat sealable multilayer films of the invention may be produced by known methods. For example, films for the cohesive failure heat seal layer (1), the support layer (2) and optionally the laminate layer (3) may be separately formed and laminated together. Alternatively, so-called a co-extrusion method may be used in which the polymers for respective layers are molten in respective extruders and are extruded through a single die into a multilayer film. In particular, the co-extrusion method is preferable because the multilayer films are formed easily and they have high interlaminar adhesion. In an exemplary co-extrusion method for producing the multilayer films, the propylene polymer (A) and the ethylene polymer (B) for forming the cohesive failure heat seal layer (1) are mixed in predetermined amounts and fed to a single extruder; the propylene block copolymer (C) or the composition containing the propylene block copolymer (C) for forming the support layer (2), and optionally the propylene polymer (H) for forming the laminate layer (3) are fed to respective extruders by a similar method to the polymers for the cohesive failure heat seal layer (1); and these materials are co-extruded into a multilayer film. Alternatively, the propylene polymer (A) and the ethylene polymer (B) for forming the cohesive failure heat seal layer (1) may be mixed in predetermined amounts beforehand and melt-kneaded in an extruder or the like to give a composition, and the composition may be used in the co-extrusion method as described above. The co-extrusion methods may be cast methods using a flat die such as T-die, or inflation methods using a circular die.

The substrate layer may be laminated by a co-extrusion method. Alternatively, the cohesive failure heat seal layer (1), the support layer (2) and optionally the laminate layer (3) may be directly co-extrusion laminated on the substrate layer. Still alternatively, the substrate layer may be dry laminated on the heat sealable multilayer film prepared beforehand, or polyethylene or the like may be melt extrusion laminated between the substrate layer and the heat sealable multilayer film prepared beforehand to unite them.

The surface of the heat sealable multilayer films of the invention may be printed with general packaging gravure inks, but the printing is not compulsory.

The heat sealable multilayer films of the invention are free of separation (delamination) of the cohesive failure heat seal layer due to penetration of oil in the packaged oil-rich contents to be retort sterilized, and have appropriate heat seal strength and excellent easy opening properties with good balance. These excellent properties are reasonably explained by that the cohesive failure of the cohesive failure heat seal layer (1) takes place appropriately at the time of opening the package.

The heat sealable multilayer films of the invention may be used not only for the packaging of oil-rich contents to be retort sterilized but also for various packaging applications.

EXAMPLES

The present invention will be described in greater detail by examples hereinbelow without limiting the scope of the invention.

In Examples and Comparative Examples, properties were determined by the following methods.

(1) Openability

Before the openability was tested, a support layer (2) or a laminate layer (3) of a corona-treated heat sealable multilayer film was dry laminated with a 12 μm thick biaxially stretched polyethylene terephthalate film through a urethane adhesive (manufactured by Mitsui Takeda Chemicals, Inc.: TAKELAC A616 (50%)+TAKELAC A65 (3.13%)+ethyl acetate (46.87%)). A laminate film was thus prepared.

A circular polypropylene container having an opening inner diameter of 6 cm, a depth of 2.5 cm and a seal flange width of 3.7 mm was filled with a mixture consisting of 80 g of Bolognaise pasta sauce and 2 g of mozzarella cheese, each was heated in a hot water. The container was then heat sealed with the laminate film by means of Pack Sealer ONT-200 manufactured by ESHIN PACK INDUSTRY CO., LTD., at a heat seal temperature of 180° C. and a heat seal pressure of 500 N/container for a heat seal time of 1 second. The heat sealed container sample was gradually cooled and was placed in a high-pressure high-temperature sterilizer of hot water showering type. The sample was treated at 121° C. for 40 minutes, cooled and allowed to cool naturally.

After the sample was allowed to cool gradually for 12 hours or more, the bottom of the container sample was cut and the content was removed. The container was washed with running water and the opening strength was evaluated by a sensory test. The opening strength was rated AA when the container was easily opened, BB when the container was opened though the opening strength was high, and CC when opening was difficult. In addition to the opening strength, the container was inspected for any separation (delamination) or stringing of the cohesive failure heat seal layer in the seal part due to penetration of oil. The inspection was made for three samples that had been treated under the same conditions.

The heat seal strength (N/15 mm) was tested as described below.

Test pieces cut into a 15 mm width were peeled at a tensile rate of 500 mm/min with Tensilon universal tester RTM-100 manufactured by ORIENTEC Co., LTD. The maximum strength was recorded as heat seal strength. The measured value is the average of five measurements.

(2) Inspection of Separation (Delamination) of Cohesive Failure Heat Seal Layer in Contact with Contents Packaged in Unsealed Portion The container samples were prepared as described in the test of openability, and the content was removed. The samples were washed with running water and were inspected for the presence or absence of separation (delamination) of the cohesive failure heat seal layer that had been in contact with the content packaged in the unsealed portion. The inspection was made by a method (i) in which the cohesive failure heat seal layer was scrubbed with a nail from the bottom of the container, and a method (ii) in which the surface of the laminate film that had been heat sealed with the container was fixed on a desk or the like, and the cohesive failure heat seal layer was scrubbed with a nail from the top of the container. The samples were evaluated AA when no separation (delamination) of the cohesive failure heat seal layer was found in both the methods, BB when the separation (delamination) of the cohesive failure heat seal layer was found in either of the methods, and CC when the separation (delamination) of the cohesive failure heat seal layer was found in both the methods. The inspection was made for three samples that had been treated under the same conditions.

(3) Melting Point

In accordance with JIS K 7121, a differential scanning calorimeter (DSC) curve was recorded at a temperature increasing rate of 10° C./min, and the highest fusion peak top temperature was recorded as the melting point.

(4) Intrinsic Viscosity [η] (dl/g)

The polymer sample was dissolved in decalin and the viscosity of the solution was measured at 135° C. with an Ubbelohde viscometer.

(5) Ethylene Content

The ethylene content was determined by $^{13}$C-NMR.

The materials used in Examples are as follows.

(1) Propylene Polymer (A-1) (Propylene/α-Olefin Random Copolymer (D-1))

Melting point: 145° C., MFR: 7 g/10 min (JIS K 7210, 230° C.)

(2) Ethylene Polymer (B-1) (High-Pressure Low-Density Polyethylene (E-1))

Density: 919 kg/m$^3$, MFR: 2 g/10 min (JIS K 7210, 190° C.)

(3) Ethylene Polymer (B-2) (High-Pressure Low-Density Polyethylene (E-2))

Density: 918 kg/m$^3$, MFR: 11 g/10 min (JIS K 7210, 190° C.)

(4) Ethylene/α-Olefin Random Copolymer (G-1)

Melting point: 68° C., density: 885 kg/m$^3$, MFR: 0.5 g/10 min (JIS K 7210, 190° C.)

(5) Propylene Block Copolymer (C-1)

Propylene block copolymer containing 86 wt % of propylene polymer component [melting point: 164° C., MFR: 2.5 g/10 min (JIS K 7210, 230° C.) and 14 wt % of propylene/ethylene random copolymer component [ethylene content: 26.6 mol %, intrinsic viscosity [η]: 3.1 dl/g]

(6) Propylene Block Copolymer Composition (C-2)

Composition prepared by melt-kneading 86 wt % of propylene block copolymer (C-1) that contained 86 wt % of propylene polymer component [melting point: 164° C., MFR: 2.5 g/10 min (JIS K 7210, 230° C.) and 14 wt % of propylene/ethylene random copolymer component [ethylene content: 26.6 mol %, intrinsic viscosity [η]: 3.1 dl/g], and 14 wt % of ethylene/α-olefin random copolymer (G-1)

(7) Propylene Block Copolymer Composition (C-3)

Composition prepared by dry blending 90 wt % of composition prepared by melt-kneading 86 wt % of propylene block copolymer (C-1) that contained 86 wt % of propylene polymer component [melting point: 164° C., MFR: 2.5 g/10 min (JIS K 7210, 230° C.) and 14 wt % of propylene/ethylene random copolymer component [ethylene content: 26.6 mol %, intrinsic viscosity [η]: 3.1 dl/g] and 14 wt % of ethylene/α-olefin random copolymer (G-1), with 10 wt % of high-pressure low-density polyethylene (E-2)

(8) Propylene Block Copolymer Composition (C-4)

Composition prepared by dry blending 70 wt % of composition prepared by melt-kneading 86 wt % of propylene block copolymer (C-1) that contained 86 wt % of propylene polymer component [melting point: 164° C., MFR: 2.5 g/10 min (JIS K 7210, 230° C.) and 14 wt % of propylene/ethylene random copolymer component [ethylene content: 26.6 mol %, intrinsic viscosity [η]: 3.1 dl/g] and 14 wt % of ethylene/α-olefin random copolymer (G-1), with 30 wt % of high-pressure low-density polyethylene (E-2)

(9) Propylene Polymer (I-1)

Propylene Homopolymer

Melting point: 162° C., MFR: 7 g/10 min (JIS K 7210, 230° C.)

(10) Propylene Polymer (H-1)

Propylene block copolymer (C-1) containing 86 wt % of propylene polymer component [melting point: 164° C., MFR: 2.5 g/10 min (JIS K 7210, 230° C.) and 14 wt % of propylene/ethylene random copolymer component [ethylene content: 26.6 mol %, intrinsic viscosity [η]: 3.1 dl/g]

(11) Propylene Polymer Composition (H-2)

Composition (C-3) prepared by melt-kneading 86 wt % of propylene block copolymer (C-1) that contained 86 wt % of propylene polymer component [melting point: 164° C., MFR: 2.5 g/10 min (JIS K 7210, 230° C.) and 14 wt % of propylene/ethylene random copolymer component [ethylene content: 26.6 mol %, intrinsic viscosity [η]: 3.1 dl/g], and 14 wt % of ethylene/α-olefin random copolymer (G-1)

(12) Propylene Polymer (H-3)

Propylene/Ethylene Random Copolymer (D-1)

Melting point: 145° C., MFR: 7 g/10 min (JIS K 7210, 230° C.)

Example 1

A resin composition prepared by dry blending 80 wt % of the propylene polymer (A-1) (the propylene/α-olefin random copolymer (D-1)) and 20 wt % of the polyethylene polymer (B-2) (the high-pressure low-density polyethylene (E-1)) was used as a material for a cohesive failure heat seal layer (1). The propylene block copolymer (C-1) was used as a material for a support layer (2). The propylene polymer (H-1) was used as a material for a laminate layer (3). These materials were supplied to respective three extruders having a diameter of 40 mm, of a three-layered non-stretched film forming apparatus. The materials were heated to an extrusion temperature of 210 to 230° C. and were extruded from a multimanifold T-die set at 210° C. The resultant film was rapidly cooled with a 30° C. casting roll to give a heat sealable multilayer film. The laminate layer (3) was subjected to corona treatment.

The total thickness of the heat sealable multilayer film was 50 μm, and the thicknesses of the cohesive failure heat seal layer (1)/the support layer (2)/the laminate layer (3) were 10/30/10 μm. The results of evaluation of the heat sealable multilayer film are set forth in Table 1.

In the heat sealable multilayer film obtained in Example 1, the propylene block copolymer (C-1) forming the support layer (2) and the propylene polymer (H-1) forming the laminate layer (3) are identical. Therefore, the support layer in the heat sealable multilayer film is practically a combination of the laminate layer (3) and the support layer (2).

Example 2

A heat sealable multilayer film was manufactured in the same manner as in Example 1, except that the propylene block copolymer (C-1) for the support layer (2) in Example 1 was replaced by the propylene block copolymer composition (C-2) and that the propylene polymer (H-1) for the laminate layer (3) was replaced by the propylene polymer (H-3).

The total thickness of the heat sealable multilayer film obtained was 50 μm, and the thicknesses of the cohesive failure heat seal layer (1)/the support layer (2)/the laminate layer (3) were 10/30/10 μm, respectively. The results of evaluation of the heat sealable multilayer film are set forth in Table 1.

Example 3

A heat sealable multilayer film was manufactured in the same manner as in Example 2, except that the propylene polymer (H-3) for the laminate layer (3) in Example 2 was replaced by the propylene polymer composition (H-2).

The total thickness of the heat sealable multilayer film obtained was 50 μm, and the thicknesses of the cohesive failure heat seal layer (1)/the support layer (2)/the laminate layer (3) were 10/30/10 μm, respectively. The results of evaluation of the heat sealable multilayer film are set forth in Table 1.

In the heat sealable multilayer film obtained in Example 3, the propylene block copolymer composition (C-2) forming the support layer (2) and the propylene polymer composition (H-2) forming the laminate layer (3) are identical. Therefore, the support layer in the heat sealable multilayer film is practically a combination of the laminate layer (3) and the support layer (2).

Example 4

A heat sealable multilayer film was manufactured in the same manner as in Example 2, except that the propylene block copolymer composition (C-2) for the support layer (2) in Example 2 was replaced by the propylene block copolymer composition (C-3).

The total thickness of the heat sealable multilayer film obtained was 50 μm, and the thicknesses of the cohesive failure heat seal layer (1)/the support layer (2)/the laminate layer (3) were 10/30/10 μm, respectively. The results of evaluation of the heat sealable multilayer film are set forth in Table 1.

Example 5

A heat sealable multilayer film was manufactured in the same manner as in Example 4, except that the propylene polymer (H-3) for the laminate layer (3) in Example 4 was replaced by the propylene polymer composition (H-2).

The total thickness of the heat sealable multilayer film obtained was 50 μm, and the thicknesses of the cohesive failure heat seal layer (1)/the support layer (2)/the laminate layer (3) were 10/30/10 μm, respectively. The results of evaluation of the heat sealable multilayer film are set forth in Table 1.

Example 6

A heat sealable multilayer film was manufactured in the same manner as in Example 4, except that the propylene block copolymer composition (C-3) for the support layer (2) in Example 4 was replaced by the propylene block copolymer composition (C-4).

The total thickness of the heat sealable multilayer film obtained was 50 μm, and the thicknesses of the cohesive failure heat seal layer (1)/the support layer (2)/the laminate layer (3) were 10/30/10 μm, respectively. The results of evaluation of the heat sealable multilayer film are set forth in Table 1.

Comparative Example 1

A heat sealable multilayer film was manufactured in the same manner as in Example 2, except that the resin composition for the cohesive failure heat seal layer (1) in Example 2 was replaced by a resin composition prepared by dry blending 65 wt % of the propylene polymer (A-1) (the propylene/α-olefin random copolymer (D-1)) and 35 wt % of the ethylene polymer (B-1) (the high-pressure low-density polyethylene (E-1)), and that the propylene block copolymer composition (C-2) for the support layer (2) was replaced by the propylene polymer (I-1).

The total thickness of the heat sealable multilayer film obtained was 50 μm, and the thicknesses of the cohesive failure heat seal layer (1)/the support layer (2)/the laminate layer (3) were 10/30/10 μm, respectively. The results of evaluation of the heat sealable multilayer film are set forth in Table 1.

Comparative Example 2

A heat sealable multilayer film was manufactured in the same manner as in Example 2, except that the resin composition for the cohesive failure heat seal layer (1) in Example 2 was replaced by a resin composition prepared by dry blending 75 wt % of the propylene polymer (A-1) (the propylene/α-olefin random copolymer (D-1)) and 25 wt % of the ethylene polymer (B-2) (the high-pressure low-density polyethylene (E-2)), and that the propylene block copolymer composition (C-2) for the support layer (2) was replaced by the propylene polymer (I-1).

The total thickness of the heat sealable multilayer film obtained was 50 μm, and the thicknesses of the cohesive failure heat seal layer (1)/the support layer (2)/the laminate layer (3) were 10/30/10 μm, respectively. The results of evaluation of the heat sealable multilayer film are set forth in Table 1.

TABLE 1

| | | Example 1 | | Example 2 | | Example 3 | | Example 4 | | Example 5 | | Example 6 | | Comparative Example 1 | | Comparative Example 2 | |
|---|---|---|---|---|---|---|---|---|---|---|---|---|---|---|---|---|---|
| Cohesive failure heat seal layer (1) | Propylene polymer (A) (Propylene/α-olefin random copolymer (D)) | D-1 | 80 | D-1 | 80 | D-1 | 80 | D-1 | 80 | D-1 | 80 | D-1 | 80 | D-1 | 65 | D-1 | 75 |
| | Ethylene polymer (B) (High-pressure low-density polyethylene (E)) | E-1 | 20 | E-1 | 20 | E-1 | 20 | E-1 | 20 | E-1 | 20 | E-1 | 20 | E-1 | 35 | E-2 | 25 |
| | MFR (g/10 min) | 2 | | 2 | | 2 | | 2 | | 2 | | 2 | | 2 | | 11 | |

TABLE 1-continued

|  |  | Example 1 | Example 2 | Example 3 | Example 4 | Example 5 | Example 6 | Comparative Example 1 | Comparative Example 2 |
|---|---|---|---|---|---|---|---|---|---|
| Support layer (2) | Propylene block copolymer (C) | C-1 | C-2 | C-2 | C-3 | C-3 | C-4 |  |  |
| Laminate layer (3) | Propylene polymer (H) | H-1 | H-3 | H-2 | H-3 | H-2 | H-3 | H-3 | H-3 |
| Openability | Opening strength*[1] | AA | AA | AA | AA | AA | AA | AA | AA |
|  | Peel condition*[2] | AA | AA | AA | AA | AA | AA | AA | CC |
| Separation (delamination) of cohesive failure heat seal layer in unsealed part*[3] |  | AA | AA | AA | AA | AA | BB | CC | CC |
| Heat seal strength [N/15 mm] (failure mode*[4]) | 160° C. |  | 14(C.F) |  |  |  |  |  |  |
|  | 170° C. |  | 19(C.F) | 20(C.F) |  |  |  |  | 20(C.F) |
|  | 180° C. |  | 19(C.F) | 21(C.F) | 24(C.F) |  |  |  | 11(C.B) |
|  | 190° C. |  | 19(C.F) | 24(C.F) | 27(C.F) | 21(C.F) |  |  |  |
|  | 195° C. |  | 20(C.F) | 24(C.F) |  | 21(C.F) |  |  |  |
|  | 200° C. |  | 20(C.F) | 25(C.F) | 28(C.F) | 22(C.F) |  |  |  |
|  | 205° C. |  | 21(C.F) | 25(C.F) |  | 22(C.F) |  |  |  |

*[1] AA: Easily opened., BB: Opened though the opening strength was high., CC: Difficult opening.
*[2] AA: No stringing., CC: Stringing.
*[3] AA: No separation of the cohesive failure heat seal layer., BB: Separation of the cohesive failure heat seal layer was found in either of the inspection CC: Separation of the cohesive failure heat seal layer was found in both of the inspection
*[4] C.F.: Cohesive Failure, C.B.: Film Breakage

INDUSTRIAL APPLICABILITY

The heat sealable multilayer films of the present invention have the cohesive failure heat seal layer (1) comprising the resin composition of the propylene polymer (A) and the ethylene polymer (B) in a controlled mixing ratio, and the support layer (2) comprising the propylene block copolymer (C) or the composition containing the propylene block copolymer (C). The heat sealable multilayer films having these features are free of separation (delamination) of the cohesive failure heat seal layer due to penetration of oil in the packaged oil-rich contents to be retort sterilized, and have appropriate heat seal strength and excellent easy opening properties with good balance.

The invention claimed is:

1. A heat sealable multilayer film comprising a cohesive failure heat seal layer (1) that comprises a resin composition including 75 to 85 wt % of a propylene polymer (A) and 15 to 25 wt % of an ethylene polymer (B) selected from a high-pressure low-density polyethylene (E) which has MFR (JIS K 7210, 190° C.) of not more than 9 (based on the total of (A) and (B) of 100 wt %), and a support layer (2) comprising a propylene block copolymer (C), wherein the propylene block copolymer (C) for the support layer (2) has a melting point higher than that of the propylene polymer (A) for the cohesive failure heat seal layer (1).

2. The heat sealable multilayer film according to claim 1, wherein the propylene polymer (A) for the cohesive failure heat seal layer (1) is a propylene/α-olefin random copolymer (D) having a melting point of 135 to 150° C.

3. The heat sealable multilayer film according to claim 1, wherein the ethylene polymer (B) for the cohesive failure heat seal layer (1) is a composition comprising a high-pressure low-density polyethylene (E) and an ethylene/α-olefin random copolymer (F).

4. The heat sealable multilayer film according to claim 1, wherein the support layer (2) comprises a composition comprising the propylene block copolymer (C) and an ethylene/α-olefin random copolymer (G).

5. The heat sealable multilayer film according to claim 1, wherein the support layer (2) comprises a composition comprising the propylene block copolymer (C) and an ethylene polymer (B).

6. The heat sealable multilayer film according to claim 5, wherein the ethylene polymer (B) contained in the support layer (2) is a high-pressure low-density polyethylene (E).

7. The heat sealable multilayer film according to claim 6, wherein the high-pressure low-density polyethylene (E) contained in the support layer (2) has MFR (JIS K 7210, 190° C.) of not more than 9.

8. The heat sealable multilayer film according to claim 1, further comprising a laminate layer (3) that is laminated on the surface of the support layer (2), on the opposite side of which the cohesive failure heat seal layer (1) is laminated.

9. The heat sealable multilayer film according to claim 8, wherein the laminate layer (3) comprises a propylene polymer (H).

10. The heat sealable multilayer film according to claim 9, wherein the propylene polymer (H) for the laminate layer (3) has a melting point lower than that of the propylene block copolymer (C) or the propylene polymer (C) for the support layer (2).

* * * * *